(12) United States Patent
Nakai et al.

(10) Patent No.: US 11,385,743 B2
(45) Date of Patent: Jul. 12, 2022

(54) LIGHT-TRANSMITTING CONDUCTIVE LAMINATE AND LIGHT-TRANSMITTING CONDUCTIVE MOLDED BODY USING SAME

(71) Applicant: Toray Industries, Inc., Tokyo (JP)

(72) Inventors: Shunichiro Nakai, Otsu (JP); Akihito Tsukamoto, Osaka (JP); Naoki Tsujiuchi, Otsu (JP); Keiji Iwanaga, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 148 days.

(21) Appl. No.: 16/082,759

(22) PCT Filed: Mar. 7, 2017

(86) PCT No.: PCT/JP2017/009003
§ 371 (c)(1),
(2) Date: Sep. 6, 2018

(87) PCT Pub. No.: WO2017/154904
PCT Pub. Date: Sep. 14, 2017

(65) Prior Publication Data
US 2019/0073055 A1      Mar. 7, 2019

(30) Foreign Application Priority Data

Mar. 11, 2016 (JP) .............................. JP2016-047994

(51) Int. Cl.
*B32B 5/02* (2006.01)
*B32B 27/20* (2006.01)
(Continued)

(52) U.S. Cl.
CPC .............. *G06F 3/044* (2013.01); *B32B 5/022* (2013.01); *B32B 27/12* (2013.01); *B32B 27/20* (2013.01);
(Continued)

(58) Field of Classification Search
CPC ...... D06N 3/00; D06N 3/0004; D06N 3/0011; D06N 3/004; B32B 5/00; B32B 5/02;
(Continued)

(56) References Cited

U.S. PATENT DOCUMENTS 4,307,144 A * 12/1981 Sanders .................. B32B 27/12
442/38
2005/0052426 A1    3/2005 Hagermoser et al.
(Continued)

FOREIGN PATENT DOCUMENTS

CN    102936357 A *  2/2013
EP    3051022 A1 *  8/2016  ............... D06N 3/06
(Continued)

OTHER PUBLICATIONS

"JP2016081817_Machine Translation" is a machine translation of JP-2016081817-A. (Year: 2016).*
(Continued)

*Primary Examiner* — Larissa Rowe Emrich
(74) *Attorney, Agent, or Firm* — Ratnerprestia (57) ABSTRACT

Provided is a light-transmitting conducive laminate which is moldable and has good designability. A light-transmitting conductive laminate is provided in which at least a surface skin material and a transparent conductive base are sequentially laminated from the input side.

11 Claims, 2 Drawing Sheets

(51) Int. Cl.
  *B32B 27/12*   (2006.01)
  *D06N 3/00*    (2006.01)
  *G06F 3/044*   (2006.01)
  *G06F 3/041*   (2006.01)
  *B60K 35/00*   (2006.01)

(52) U.S. Cl.
  CPC ............ *B60K 35/00* (2013.01); *D06N 3/0011* (2013.01); *G06F 3/041* (2013.01); *B32B 2307/202* (2013.01); *B32B 2307/412* (2013.01); *B60K 2370/1446* (2019.05); *G06F 2203/04809* (2013.01)

(58) Field of Classification Search
  CPC ......... B32B 5/022; B32B 5/024; B32B 27/12; B32B 27/36; B32B 27/20; B32B 2255/02; B32B 2307/41; B32B 2307/412; B32B 2307/414; B32B 2313/04; B32B 2457/20–208; B32B 15/04; B32B 15/14; B32B 15/06; B32B 15/20; B32B 9/025; B32B 9/045; B32B 7/12; B60Q 3/14; B60K 35/00; B60K 2370/1446; G06F 2203/04809; G06F 3/044; G06F 3/041; F21V 23/0485
  See application file for complete search history.

(56) References Cited

U.S. PATENT DOCUMENTS

| | | | | |
|---|---|---|---|---|
| 2011/0127472 | A1* | 6/2011 | Sato ........................ | C09C 1/44 |
| | | | | 252/511 |
| 2012/0032592 | A1* | 2/2012 | Breunig ................... | B60Q 3/64 |
| | | | | 315/77 |
| 2013/0194230 | A1 | 8/2013 | Kawaguchi et al. | |
| 2013/0209791 | A1* | 8/2013 | Oi ............................ | B05D 5/12 |
| | | | | 428/331 |
| 2013/0301287 | A1* | 11/2013 | Schlemmer .............. | B60Q 3/54 |
| | | | | 362/511 |
| 2014/0008115 | A1* | 1/2014 | Sato ........................ | H05K 1/02 |
| | | | | 174/258 |
| 2014/0106122 | A1 | 4/2014 | Eguchi et al. | |
| 2015/0169115 | A1 | 6/2015 | Mikolajczak et al. | |
| 2016/0207489 | A1 | 7/2016 | Honmatsu et al. | |

FOREIGN PATENT DOCUMENTS

| | | | |
|---|---|---|---|
| JP | 2008057098 A | | 3/2008 |
| JP | 2009078375 A | | 4/2009 |
| JP | 2011108269 A | | 6/2011 |
| JP | 2013175149 A | | 9/2013 |
| JP | 2014173203 A | * | 9/2014 |
| JP | 2014173203 A | | 9/2014 |
| JP | 2014185404 A | * | 10/2014 |
| JP | 2015115077 A | | 6/2015 |
| JP | 2015115157 A | | 6/2015 |
| JP | 2015214334 A | | 12/2015 |
| JP | 2016081817 A | * | 5/2016 |
| JP | 2016081817 A | | 5/2016 |
| WO | 2011142433 A1 | | 11/2011 |
| WO | 2015041001 A1 | | 3/2015 |

OTHER PUBLICATIONS

"JP2014173203_Machine Translation" is a machine translation of JP-2014173203-A. (Year: 2014).*
"JP2014185404_Machine Translation" is a machine translation of JP-2014185404-A. (Year: 2014).*
"EP3051022_Machine Translation" is a machine translation of EP-3051022-A1. (Year: 2016).*
"CN102936357_Machine Translation" is a machine translation of CN-102936357-A. (Year: 2013).*
International Search Report and Written Opinion for International Application No. PCT/JP2017/009003, dated May 9, 2017—6 pages.

* cited by examiner

LIGHT-TRANSMITTING CONDUCTIVE LAMINATE AND LIGHT-TRANSMITTING CONDUCTIVE MOLDED BODY USING SAME

CROSS REFERENCE TO RELATED APPLICATIONS

This is the U.S. National Phase application of PCT/JP2017/009003, filed Mar. 7, 2017, which claims priority to Japanese Patent Application No. 2016-047994, filed Mar. 11, 2016, the disclosures of these applications being incorporated herein by reference in their entireties for all purposes.

FIELD OF THE INVENTION

The present invention relates to a light-transmitting conductive laminate. More specifically, the present invention relates to a light-transmitting conductive laminate which allows light transmission as well as three dimensional molding and which has excellent electro-conductivity; and also, to a light-transmitting conductive molded laminate produced by using such light-transmitting conductive laminate.

BACKGROUND OF THE INVENTION

Mechanical switches have been provided near the driver's seat of cars to control audio and equipment heater control panel. Although mechanical switches have the merits of less frequent malfunctioning and presence of reliable input feeling, the number of switches are increasing with the recent adoption of many functions, and in view of the operativity and design freedom, there is a demand for reduction in the number and simplification of the switches.

In view of such situation, integration of the switches to car navigation system and information display is recently on its way. Resistive membrane and capacitive touch sensors have been used for the input of these devices, and reduction in the number and simplification of switches have been enabled since various types of the information can be shown on the liquid crystal display. Patent Document 1 proposes facilitation of the information identification by allowing change of the display area, namely, widening of the area where the functions needed by the driver are displayed while leaving minimum functions and the display area for the unnecessary contents.

In addition, there is a demand for new surface decoration technology to cope with the needs for product differentiation and taste diversity of the users, and Patent Document 2 proposes a synthetic resin molded article with a leather-like appearance and feel having a design surface where a transparent design pops up on the surface of the leather-like surface when the backlight is turned on (Patent Documents 1 and 2).

Also proposed is a light-transmitting leather-like sheet where the light from the light-emitting member is transmitted through the transmission section formed in one area of the sheet. This technology can be equipped with a contact switch so that the light source can be turned on by pushing via the leather-like sheet provided on the contact switch and the light passed through the transmission section is displayed on the leather-like sheet.

PRIOR ART DOCUMENTS

Patent Documents

Patent Document 1: Japanese Unexamined Patent Publication (Kokai) No. 2015-214334

Patent Document 2: Japanese Unexamined Patent Publication (Kokai) No. 2014-173203

Patent Document 3: Japanese Unexamined Patent Publication (Kokai) No. 2016-81817

SUMMARY OF THE INVENTION

However, current liquid crystal display is a flat plane, and this results in the reduced design freedom in the case of the car interior where the articles often have three dimensional shape. There has also been a problem that the driver could not recognize where the driver is touching because the touch sensor provided on the liquid crystal display was also a flat plane.

Also, in the technology of Patent Document 2, the surface is constituted from a resin elastomer. With regard to the appearance and feel of the surface, the synthetic leather produced by coating a resin on a woven fabric and giving a full grain leather-like texture to the surface and the artificial leather produced by impregnating a polymeric elastomer in a nonwoven fabric and giving a full grain leather-like texture or suede-like texture to the surface both suffered from lack of high-quality appearance.

In the technology of Patent Document 3, a leather-like sheet having a high-quality appearance is provided on the surface. However, the switch is turned on by pushing the leather-like sheet and the leather-like sheet is deformed by the pushing, and as a consequence, the favorable appearance was lost by the repeated operation due to the stretching of the leather-like sheet and the friction applied to the leather-like sheet in the course of the strong pushing.

In view of the problems as described above, an object of the present invention is to provide a light-transmitting conductive laminate not losing its appearance quality after repeated input operations that can be molded into a shape allowing easy operation without sacrificing the good design.

In view of solving the problems as described above, the present invention are as described below.

(1) A light-transmitting conductive laminate at least comprising a surface material and a transparent conductive substrate laminated in this order from input side.

(2) A light-transmitting conductive laminate wherein the surface material consists of at least one member selected from the group consisting of woven fabric, knitted fabric, nonwoven fabric, synthetic leather, and artificial leather.

(3) A light-transmitting conductive laminate wherein the surface material comprises a layer consisting of a nonwoven fabric.

(4) A light-transmitting conductive laminate wherein at least one fiber substance constituting the surface material has been napped.

(5) A light-transmitting conductive laminate wherein the surface material contains a synthetic fiber having a single fiber fineness of up to 2 dtex and a polymer elastomer.

(6) A light-transmitting conductive laminate wherein the light-transmitting conductive laminate has a total light transmission of at least 50%.

(7) A light-transmitting conductive laminate wherein the light-transmitting conductive laminate has a surface resistance of 1 to 1000 Ω/□.

(8) A light-transmitting conductive laminate wherein the transparent conductive substrate contains at least one member selected from the group consisting of nanocarbon, indium-tin oxide, silver, copper mesh, metal nano-wire, and electroconductive polymer.

(9) A light-transmitting conductive molded laminate prepared by using the light-transmitting conductive laminate.

(10) A light-transmitting conductive molded laminate wherein the transparent conductive substrate contains a nanocarbon or an electroconductive polymer.

(11) A capacitive touch sensor prepared by using the light-transmitting conductive laminate.

(12) A method for producing the light-transmitting conductive molded laminate wherein the light-transmitting conductive laminate is molded by at least one member selected from the group consisting of film insert molding, vacuum molding, three dimensional laminate molding, and thermal press molding.

When the light-transmitting conductive laminate of the present invention is used, for example, as a touch switch in a car, a high design freedom is provided since the switch is hidden in the surface material when the switch is not used while the display section pops up to function as a switch when light is projected from the rear surface by the operation such as the touching of the surface material surface. In addition, the light-transmitting conductive molded laminate of the present invention can be provided with surface irregularity that can be recognized by touching, and therefore, the presence of the switch can be recognized while the driver is looking forward during the driving and the switch functions without erroneous operation.

DETAILED DESCRIPTION OF CERTAIN EMBODIMENTS OF THE INVENTION

[Light-Transmitting Conductive Laminate]

The light-transmitting conductive laminate of the present invention is a light-transmitting conductive laminate at least comprising a surface material and a transparent conductive substrate laminated in this order from the input side. The light-transmitting conductive laminate of the present invention allows light transmission, and therefore, figures, letters, or other designs can be indicated on its surface by the light emitted from the light source such as LED placed on the side of the transparent conductive substrate (namely, on the rear side). Accordingly, the light-transmitting conductive laminate of the present invention can be used as a capacitive touch sensor which functions as a switch wherein the light source is turned on when the surface of the surface material is touched by a finger or when the hand approaches the surface material surface. Since it can be used as a touch sensor, the damage to the surface material touched by the hand or the like in the operation during the practical use will be reduced and the quality is less likely to be deteriorated compared to the push down switches.

The input side is the surface where the operation of the touch sensor is conducted by touching with a hand or the like.

Figure 1:
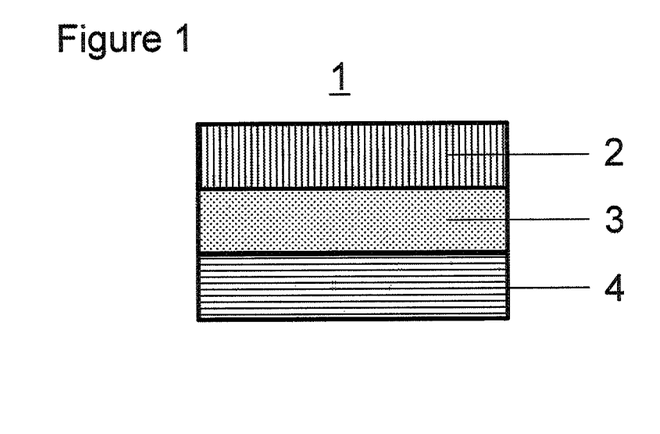
FIG. 1 is a schematic cross sectional view of the light-transmitting conductive laminate of the present invention.
Figure 2:
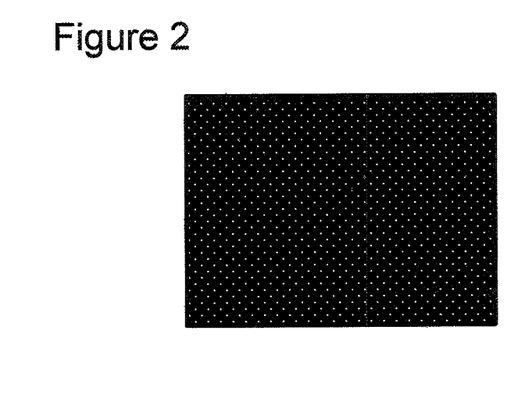
FIG. 2 is a schematic view seen from the input side of the capacitive touch sensor prepared by using the light-transmitting conductive laminate of the present invention when the touch sensor is not in use.
Figure 3:
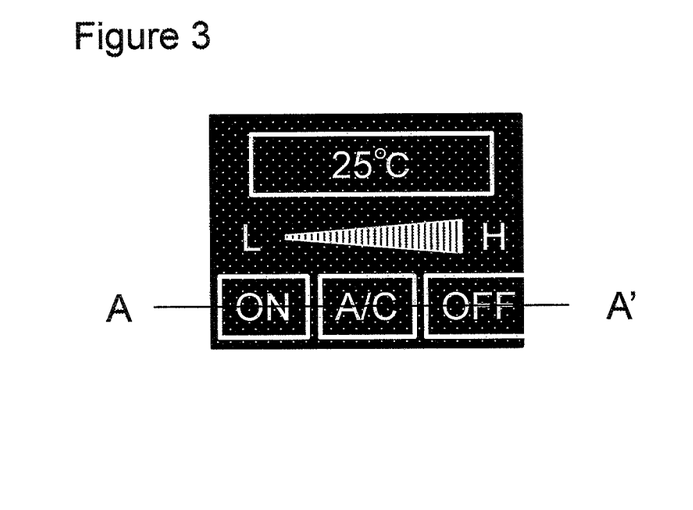
FIG. 3 is a schematic view seen from the input side in the use of the capacitive touch sensor prepared by using the light-transmitting conductive laminate of the present invention.
Figure 4:
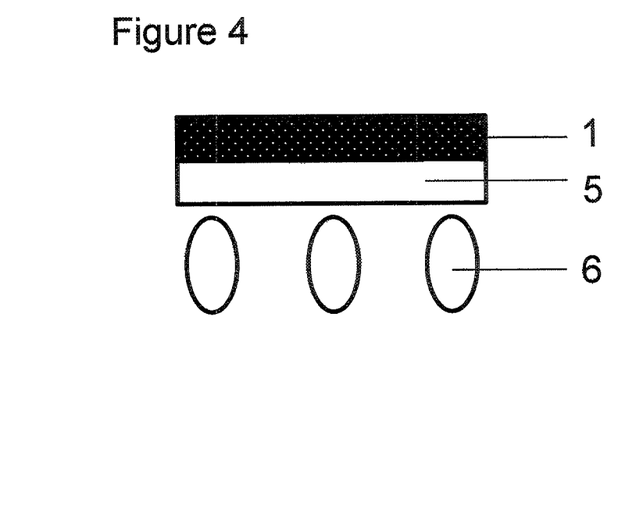
FIG. 4 is a cross sectional view taken along lines A-A' in FIG. 3.
Figure 5:
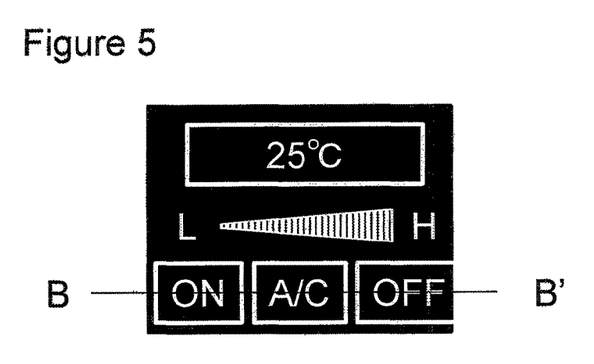
FIG. 5 is a schematic view seen from the input side in the use of the capacitive touch sensor prepared by using the light-transmitting conductive laminate of the present invention.
Figure 6:
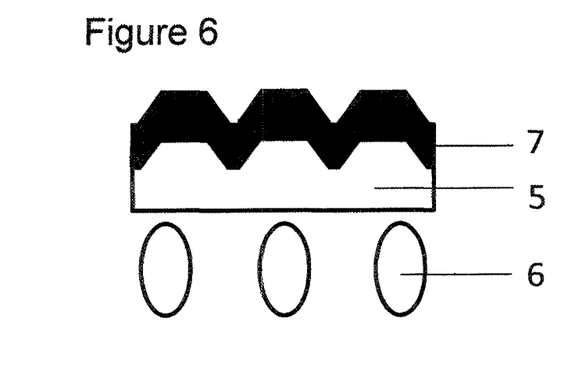
FIG. 6 is a cross sectional view taken along lines B-B' in FIG. 5.

In the capacitive touch sensor shown in FIGS. 2 to 4, for example, the outgoing brightness when the light of 3000 $cd/m^2$ from the LED 6 entered the light-transmitting conductive laminate through a diffusion plate 5 is preferably at least 50 $cd/m^2$, and more preferably at least 100 $cd/m^2$. The display section will be readily recognized when the outgoing brightness is within such range.

[Surface Material]

In the present invention, the surface material used in the light-transmitting conductive laminate may be a fabric such as a woven fabric or a knitted fabric, a synthetic leather produced by coating a resin on a nonwoven fabric or a woven fabric and giving a full grain leather-like texture to the surface, or an artificial leather produced by impregnating a polymeric elastomer in a nonwoven fabric and giving a full grain leather-like texture or suede-like texture to the surface. Of these, the preferred is the one wherein the surface material contains a nonwoven fabric layer or a napped layer in view of visual recognizability of the letters and symbols of the switch when the light source at the back of the light-transmitting conductive laminate is turned on.

The woven fabric or the nonwoven fabric constituting the surface material may comprise a natural fiber such as cotton, linen, wool, or silk, a polyester such as polyethylene terephthalate, polybutylene terephthalate, polytrimethylene terephthalate, or polyethylene-2,6-naphthalene dicarboxylate, a polyamide such as 6-nylon or 66-nylon, or a synthetic fiber such as polyvinyl alcohol, polyacryl, polyethylene, or polypropylene, which may be used alone or in combination. The fiber constituting the surface of the surface material is preferably a polyester fiber such as polyethylene terephthalate, polybutylene terephthalate, or polytrimethylene terephthalate in view of strength, size stability, light resistance, and dying ability. When a fabric or a synthetic leather is used for the surface material, the woven fabric used may be a plain, twill, or satin woven fabric, and the knitted fabric may be a weft knitted fabric such as those knitted by plain knitting, rib knitting, or purl knitting, or a warp knitted fabric such as those knitted by single tricot stitch, single cord stitch, or single atlas stitch.

The weaving density of the woven fabric is preferably in the range of 40 to 300 threads/inch (warp) and 40 to 200 threads/inch (weft), and the knitting density of the knitted fabric is preferably in the range of 40 to 70 courses and 30 to 50 wales. When the weaving density is less than 40 threads/inch (warp) and 40 threads/inch (weft) or the knitting density is less than 40 courses and 30 wales, the excessively low density may result in the presence of openings, which in turn results in the insufficient anti-see-through property of the surface material and insufficient visual recognizability of the letters and symbols of the switch when the light source is turned on. In the meanwhile, when the weaving density is in excess of 300 threads/inch (warp) and 200 threads/inch (weft) or the knitting density is in excess of 70 courses and 50 wales, the excessively high density is likely to result in the damage of the surface material texture.

When the surface material comprises a nonwoven fabric or a synthetic leather, it is important that the ultrafine fibers constituting the nonwoven fabric has an average single fiber fineness of at least 0.001 dtex and up to 1.0 dtex in view of the sheet softness and the quality after the sueding of the surface. The average single fiber fineness is preferably up to 0.5 dtex and more preferably up to 0.3 dtex. On the other hand, the average single fiber fineness is preferably at least 0.01 dtex in view of color development and color fastness after the dyeing.

When the nonwoven fabric is used, a woven or knitted fabric may be inserted in the interior of the nonwoven fabric for the purpose of improving the strength and the like. The fibers constituting the woven or knitted fabric are not particularly limited for their average single fiber fineness, and the average single fiber fineness may be at least 0.001 dtex and up to 2 dtex.

The surface material may have a polymer elastomer impregnated therein, or a surface layer comprising a polymer elastomer provided therewith. Exemplary polymer elastomers include polyamide elastomers such as polyurethane elastomer, acryl elastomer, and polyamide elastomer, polyester elastomers such as polyester elastomer, and polystyrene elastomer, polyolefin elastomer. Of these the most preferred are polyurethane elastomers in view of the excellent softness and bulkiness.

The method used for producing the polyurethane is not particularly limited, and a method known in the art, for example, adequate reaction of a polymer polyol, a diisocyanate, and a chain extender can be used. The reaction system may be either a solvent system or an aqueous dispersion system.

Exemplary polyols include polycarbonate diols, polyester diols, polyether diols, silicone diols, and copolymers produced by combining these diols, and in view of the resistance to hydrolysis, the preferred is use of a polycarbonate diol or a polyether diol, and in view of light resistance and heat resistance, the more preferred is use of a polycarbonate diol.

The weight per unit area of the woven or nonwoven fabric constituting the surface material is not particularly limited, while the weight per unit area is typically 100 to 1800 g/m$^2$ and more preferably 200 to 900 g/m$^2$. In addition, the woven fabric and the nonwoven fabric are not limited for their apparent density while the apparent density is typically at least 0.20 g/cm$^3$ and preferably at least 0.30 to 0.70 g/cm$^3$. When the apparent density is too low, the surface material may not be provided with sufficient anti-see-through property due to the presence of the parts where the fibers are dense and scarce, and the contour of the letters and symbols of the switch may become ambiguous when the light source is turned on. In the meanwhile, an excessively high apparent density is likely to invite loss of soft texture and loss of moldability.

When the fibrous matrix constituting the surface material is a woven fabric, the fabric preferably has a napped layer on one surface or on opposite surfaces. When the woven fabric has no napped layer, interference patterns may be generated by the texture of the woven or knitted fabric when the light source is turned on, and this may results in the ambiguous letters or symbols on the switch as well as variation in the brightness resulting in the reduced visual recognizability. Also, the fibrous matrix constituting the surface material preferably has a napped layer when the woven fabric is provided with the surface layer comprising a polymeric elastomer to constitute a synthetic leather.

The thickness of the surface material is not particularly limited although it is typically 0.3 to 3 mm, preferably 0.5 to 2 mm, and more preferably 0.5 to 1 mm. The surface material preferably has a reduced thickness in view of improving the total light transmission to the extent not adversely affecting the anti-see-through property and other physical properties as described below.

The surface material preferably has an anti-see-through property of at least 90%. When the anti-see-through property is at least 90%, the design freedom will not be sacrificed since the color and the pattern of the molded article covered by the light-transmitting conductive laminate will be sufficiently shielded when the light is not projected from the rear surface of the light-transmitting conductive laminate. The anti-see-through property is preferably at least 95% and more preferably at least 97%.

While the surface resistance of the surface material is determined by the surface resistance of the transparent conductive substrate laminated, when the surface material is used for a capacitive touch switch used in a car and the surface resistance of the transparent conductive substrate is 100Ω/□, the surface resistance of the surface material is preferably at least $10^5$Ω/□ and up to $10^{11}$Ω/□, more preferably at least $10^6$Ω/□ and up to $10^{11}$Ω/□, and still more preferably at least $10^7$Ω/□ and up to $10^{10}$Ω/□. When the surface resistance is within such range, the touch sensor operation is not inhibited and the function as an antistatic is maintained.

[Production Method of the Surface Material]

Exemplary fibers used for the fibrous matrix constituting the surface material include fibers produced by direct melt spinning, spun fibers, and ultrafine fibers collected from an ultrafine fiber-generating fiber such as an ultrafine fiber obtained by melting or decomposing the sea component from an islands-in-the-sea fiber.

Exemplary methods used for producing the nonwoven fabric include spun-bonding, namely, spinning islands-in-the-sea composite fiber by melt spinning and collecting the fiber on the net without cutting to form a long fiber web, dry method wherein staples prepared by cutting the fiber to an arbitrary fiber length (for example 18 to 110 mm) is carded or air-laid, and web formation by filtration using a slurry prepared by dispersing the fiber in water.

The resulting web is preferably entangled by waterjet entanglement called spun lacing, needle punching, or the like to thereby obtain the strength required for use as a surface material.

If desired, the resulting nonwoven fabric may be further subjected to a shrinking treatment by hot water or steam treatment to improve dense feeling of the fibers.

In the formation of the ultrafine fibers from the islands-in-the-sea composite fiber in the fibrous matrix, the composite fiber is converted to a fiber bundle of ultrafine fibers by a chemical method wherein the sea component is swollen, extracted, or decomposed for the removal with water, a solvent, or the like. For example, in the case of the islands-in-the-sea composite fiber wherein the polystyrene is used for the sea component, the sea component may be removed by a treatment using trichloroethylene, and in the case of the islands-in-the-sea composite fiber wherein the a water-soluble resin such as polyvinyl alcohol resin or a resin easily decomposed with an alkali is used for the sea component, the sea component may be removed by a heat treatment with a hot aqueous reagent such as water, alkaline aqueous solution, acidic aqueous solution, or the like.

Other methods used in the formation of the ultrafine fibers from the islands-in-the-sea composite fiber include mechanical methods where the ultrafine fibers are produced by applying a physical stimulation, and exemplary such methods include the needle punching and the waterjet punching as described above and methods wherein a pressure is applied by the rollers sandwiching the fibers and the method of conducting a ultrasonication.

In the formation of the ultrafine fibers from the islands-in-the-sea composite fiber, the fiber may be applied with a water-soluble resin such as polyvinyl alcohol as a temporary reinforcement. The reinforcement used is preferably the one which is capable of temporally retaining the sheet shape and also capable of being removed in the subsequent step by extraction.

When the fibrous matrix is a nonwoven fabric, a polymer elastomer is preferably impregnated in the nonwoven fabric which has been subjected to the shrinking treatment before or after converting the fiber into the ultrafine fiber in order to improve morphological stability of the nonwoven fabric.

When the polymer elastomer is a polyurethane, its content is preferably 4 to 40% by weight and more preferably 8 to 30% by weight in relation to the total of the polyurethane and the nonwoven fabric formed. When the content of the polyurethane elastomer is less than 4% by weight, provision of the shape stability will be insufficient, while content in excess of 40% by weight is likely to invite loss of soft texture and loss of moldability.

The method used for impregnating the nonwoven fabric with the polyurethane is preferably dip nip method wherein the cycle of dipping the entangled web sheet in a bath filled with a solution or aqueous emulsion of the polyurethane and squeezing the sheet with a press roll or the like to the predetermined degree of impregnation is conducted once to several times. Other methods include bar coating method, knife coating method, roll coating method, comma coating method, and spray coating method.

Other methods include impregnation of the nonwoven fabric with polyurethane followed by coagulation of the polyurethane by a dry method such as heat-sensitive coagulation or coagulation by drying, wet heating, or submerged coagulation in a solution to thereby secure the polyurethane in the entangled web sheet. Of these, the preferred is the coagulation wherein the polyurethane is coagulated by a dry method since the polyurethane will be transparent. When the polyurethane in the nonwoven fabric becomes transparent by the dry method, total light transmission is likely to be improved to facilitate visual recognition of the letters and symbols. It is also preferable to cure the polyurethane by subjecting the polyurethane to a heat treatment after the coagulation and drying to thereby crosslink the coagulated polyurethane.

The temperature used for drying and curing is preferably at least 80° C. and up to 180° C. and more preferably at least 90° C. and up to 160° C. since the time required for the treatment may be excessively long when the temperature is too low, and the polyurethane may be thermally degraded when the temperature is too high.

The polyurethane resin may contain various additives including pigments such as carbon black, flame retardants such as phosphorus, halogen, silicone, and inorganic flame retardants, antioxidants such as phenol, sulfur, phosphorus antioxidants, UV absorbents such as benzotriazole, benzophenone, salicylate, cyanoacrylate, and oxalic acid anilide UV absorbents, a light stabilizer such as hindered amine or benzoate stabilizer, anti-hydrolytic stabilizers such as polycarbodiimide, plasticizer, antistatic agent, surfactant, softener, water repellent, coagulation adjusting agent, dye, antiseptic agent, antimicrobial agent, deodorant agent, and fillers such as cellulose particles, and inorganic particles such as silica and titanium oxide. If further improvement in the total light transmission is required, the polyurethane preferably has no color, and the polyurethane resin is preferably free from colored additives such as carbon black or other pigments and dyes.

Next, the resulting nonwoven fabric provided with the polyurethane may be separated to at least 2 slices in the direction perpendicular to the thickness direction of the nonwoven fabric. This slicing is a treatment similar to the separation process commonly used in the treatment of the natural leather conducted, for example, by a slicer manufactured by Murota Seisakusho Corporation. The nonwoven fabric can be adjusted to the target thickness by the slicing, the buffing treatment as will be described later, or a combination thereof.

When the surface of the fibrous matrix constituting the surface material is buffed with a sandpaper or the like for napping or piling, a suede or nubuck-like surface material will be obtained.

When a surface layer comprising a polymer elastomer is provided on the surface of the fibrous matrix constituting the surface material, a full grain leather-like surface material will be obtained.

If desired, the surface material is dyed. The dyeing may be conducted by adequately selecting a die depending on the type of the fiber from dies mainly comprising a disperse dye, reactive dye, acidic dye, metal complex dye, sulfur dye, and sulfur vat dye and using a dyeing machine normally used for dyeing a fiber such as padder, jigger, circular, or winch machine. For example, when the ultrafine fiber is a polyester ultrafine fiber, the fiber is preferably died by high-temperature, high-pressure dyeing using a disperse dye.

Dyeing of the surface material in pale color is also a preferable embodiment for improving the total light transmission.

The surface material may also optionally contain a functional reagent such as dye, softener, texture controlling agent, anti-pilling agent, antimicrobial agent, deodorant agent, water repellent, light resisting agent, and anti-weathering agent.

[Transparent Conductive Substrate]

The transparent conductive substrate used in the present invention is a substrate prepared by mixing a conductive material and a resin or a substrate prepared by laminating a conductive material on at least one surface of the transparent substrate, and in view of obtaining electroconductivity without sacrificing the transparence, the preferred is the one prepared by laminating a conductive material on at least one surface of the transparent substrate.

The transparent substrate used may be adequately selected depending on the application and the method used for the molding, and the preferred is the one comprising a thermoplastic resin in view of the productivity of the light-transmitting conductive laminate. More specifically, the transparent substrate is preferably the one containing at least one member selected from the group consisting of polyester resin, polycarbonate resin, acrylic resin, cyclic olefin resin, polyallylate resin, acrylonitrile-butadiene-styrene copolymerization synthetic resin. The transparent substrate may be the one prepared by combining two or more transparent substrates, for example, a composite substrate such as a transparent substrate prepared by laminating two or more resins.

The shape of the substrate may be adequately selected depending on the application. For example, when a decoration board or the like is provided on the upper side of the transparent conductive substrate used in the present invention, the shape is preferably a resin film having a thickness of up to 300 μm, more preferably up to 200 μm, still more preferably up to 150 μm, and most preferably up to 100 μm in view of cost, productivity, handling convenience, and the like. In the meanwhile, when the light-transmitting conductive laminate of the present invention is used alone, a resin plate having a thickness of at least 300 μm may be used for the provision of the strength to the laminate.

If desired, the transparent substrate may be subjected to a surface treatment such as corona treatment or plasma treatment or an undercoat may be provided on the transparent substrate to facilitate lamination of the conductive material on the transparent substrate.

The conductive material may be adequately selected depending on the environment where the conductive material is used. When the light-transmitting conductive laminate has a planar or curved shape, exemplary preferable materials include nanocarbon, electroconductive polymer, indium-tin oxide, silver or copper mesh, and metal nanowire.

The method used for laminating the conductive material is not particularly limited, and exemplary methods include conventional wet coating methods such as spray coating, dip coating, spin coating, knife coating, kiss coating, gravure coating, slot die coating, roll coating, bar coating, screen printing, inkjet printing, pat printing, and other printing methods. Use of a dry coating is also appropriate, and exemplary such methods include physical gas phase deposition such as sputtering and vapor deposition as well as chemical phase deposition. The coating may be conducted by several divided steps or by a combination of two different coating methods. Preferable coating methods are wet coating methods such as gravure coating, bar coating, and die coating, and after laminating the conductive material to form the conductive layer, an overcoat layer may be disposed to an extent not adversely affecting the electroconductivity to thereby improve adhesion with the material laminated on the conductive layer and improve reliability of the conductive material.

[Light-Transmitting Conductive Laminate]

The method used in producing the light-transmitting conductive laminate by laminating the surface material and the transparent conductive substrate is preferably a method wherein the adhesion is accomplished using an adhesive, and most preferably, the method wherein a heat melting adhesive is coated on the rear surface of the surface material and the integration by lamination is then conducted by laminating with the film. In this process, the material used for the heat melting adhesive preferably has a melting point lower than that of the resin material used for the film. The method used for coating the heat melting adhesive on the rear surface of the surface material include the method wherein the adhesive is coated on the entire rear surface of the surface material and the method wherein the adhesive is coated in some spots of the rear surface.

The light-transmitting conductive laminate used in the present invention preferably has a total light transmission of at least 1%, more preferably at least 5%, still more preferably at least 10%, and most preferably at least 20%. The total light transmission in such range is preferable since the light from the light source can pass through the light-transmitting conductive laminate when the total light transmission is in such range, and the letters and symbols are visually recognizable.

The transparent conductive substrate used in the present invention preferably has a surface resistance of at least 1Ω/□ and up to 1000Ω/□. The surface resistance which is adequately determined depending on the device used is, for example, preferably 100 to 2000Ω/□, more preferably 100 to 1000Ω/□, and still more preferably 100 to 500Ω/□ when the device is a capacitive touch sensor. The surface resistance in such range is preferable since designing of IC controllers is facilitated and smooth functioning of the device is enabled.

Display marks, wiring, and the like may be printed on the transparent conductive substrate used in the present invention. The method used for the printing may be adequately selected depending on the type of the ink used for the printing and thickness, and exemplary printing methods include screen printing, offset printing, and ink jet printing.

[Molding Process]

The light-transmitting conductive laminate of the present invention can be produced into a light-transmitting conductive molded laminate having the desired shape including the provision of surface irregularities by using various molding methods. Since provision of the surface irregularities and the like by the molding process enables recognition of the position of the switch while the driver is driving and looking the front direction, and this enables use of the switch without malfunctioning.

The methods that can be used for the molding include vacuum molding, compressed air molding, compressed air vacuum molding which is a combination of the vacuum molding and the compressed air molding, press molding, plug molding, laminate molding, in-mold molding, and insert molding. In the present invention, the method used for the molding may be determined in view of the nature of the resin used for the substrate of the light-transmitting conductive laminate, the nature of the resin used for the layer disposed on the substrate, the nature of the surface material, thickness of each layer, and the shape molded. In view of the productivity, the preferred are film insert molding, vacuum molding, three-dimensional laminate molding, and heat press molding.

[Light-Transmitting Conductive Molded Laminate]

The light-transmitting conductive molded laminate as used in the present invention is the article produced by molding the light-transmitting conductive laminate of the present invention, for example, by the method described in the section of "Molding process". The transparent conductive substrate used in the light-transmitting conductive molded laminate is preferably a nanocarbon or electroconductive polymer in view of the moldability, and in view of the degree of expansion in the molding, heat applied in the molding, and reliability in the exposure to UV and high temperature, high humidity conditions, the most preferred is the use of the nanocarbon. Exemplary nanocarbon materials include carbon nanotube (also abbreviated as CNT), graphene, fullerene, graphene ribbon in the form of a thin slab, peapod wherein fullerene is enclosed in the carbon nanotube, and cone-shaped Nano horn, and in view of the electro conductivity and the productivity, the preferred is use of carbon nanotube. The molded article of the present invention can also be used after adhering a decoration film or other resin material.

[Applications]

The light-transmitting conductive laminate and the light-transmitting conductive molded laminate of the present invention can be used, for example, in a touch sensor, light-transmitting planar heater, electromagnetic shield, and most preferably, in a capacitive touch sensor. When used in home appliance, equipment in a car, or building material, an excellent touch sensor will be provided due to the improved design freedom since they can be curved and molded.

EXAMPLES

Next, the present invention is described in detail by referring to the Examples which by no means limit the scope of the present invention.
[Evaluation Method]
(1) Surface Resistance 4 point probe was brought in close contact with the surface of the transparent conductive substrate where the conductive material had been disposed, and surface resistance $R_0$ of the conductive layer surface was measured by 4 terminal method at the room temperature. The instrument used for the measurement was resistivity meter model MCP-T360 manufactured by Daia Instruments, and the probe used was 4 point probe MCP-TFP manufactured by Daia Instruments. When the sample width is insufficient and measurement by the 4 terminal method is difficult, a silver paste ("ECM-100" manufactured by TAIYO INK MFG. CO., LTD.) may be coated on the opposite edges of the sample in a width of 5 mm, and after drying at 90° C. for 30 minutes, the resistance between the terminals may be measured by a tester to calculate the surface resistance.

(2) Total Light Transmission of the Light-Transmitting Conductive Laminate

The light-transmitting conductive laminate was measured for its total light transmission according to JIS-K7361 (1997) by using a turbidity meter ("NDH4000" manufactured by NIPPON DENSHOKU INDUSTRIES CO., LTD.) with the light entering from the side of the surface of the transparent conductive substrate. The light-transmitting conductive laminates having a total light transmission of at least 1% were determined as those adequate for the light-transmitting electroconductive laminate.

(3) Anti-See-Through Property of the Surface Material

The anti-see-through property was evaluated by the anti-see-through property test carried out in Kaken Test Center (General Foundation). The light-transmitting conductive laminate was placed on a white tile and on a black tile, respectively, and the color on the surface of the surface material was measured with a colorimeter. Lightness was measured for each cases when the white tile and black tile were under the light-transmitting conductive laminate, and the anti-see-through property (%) was calculated by the following equation. The material having an anti-see-through property of at least 90% was evaluated as a material adequate for use in the light-transmitting electroconductive laminate.

Anti-see-through property (%)=(lightness in the use of the black tile)/(lightness in the use of the white tile)×100

(4) Visual Recognizability of the See-Through Letters of the Surface Material

On a backlight with a brightness of 3000 cd/m² prepared by using a white LED 30000 cd/m² and a diffusion plate with a total light transmission of 20%, a black light-shielding film having letters "B" and "E" (Arial font, 5 mm×5 mm) cut out from the film was placed, and the letters were covered with the light-transmitting conductive laminate to conduct visual inspection from a distance of 50 cm for the grading by the following criteria.

Panel: 5 women in their twenties each having eyesight of at least 1.0 (corrected vision)

Grading: Grading was conducted by the 5 evaluators by the following criteria, and those gaining at least 11 points in total were evaluated as adequate for the light-transmitting electro conductive laminate.

3: the letter B could be distinguished from E
2: the letter B could not be distinguished from E
1: the letters could not be confirmed Next, the surface materials used in the Examples and Comparative Examples are described.
[Surface Material 1]

An islands-in-the-sea composite staple comprising 20 parts of polystyrene as the sea component and 80 parts of polyethylene terephthalate as the island component having a single fiber fineness of 3.8 decitex, island number of 16, and a staple length of 51 mm was passed through a card and crosslapper to produce a web. Next, the web was treated by an L barb needle punching at a punching density of 3000 fibers/cm² to obtain a composite staple nonwoven fabric having an apparent fiber density 0.23 g/cm³. Next, the web was immersed in an aqueous solution of polyvinyl alcohol having a degree of polymerization of 500 and a degree of saponification of 88% heated to about 95° C. after adjusting the solid content to a concentration of 12% by weight so that the coating weight was 25% in terms of the solid content in relation to the weight of the nonwoven fabric. Shrinking treatment of 2 minutes was also conducted simultaneously with the impregnation of PVA, and drying was conducted at 100° C. to remove the moisture. The resulting sheet was treated with trichlene at about 30° C. until the polystyrene was fully removed to obtain an ultrafine fiber sheet having a single fiber fineness of about 0.21 decitex.

Next, the ultrafine fiber sheet was impregnated with a DMF (N,N-dimethylformamide) solution of polycarbonate polyurethane resin which has been adjusted to a solid content concentration of 12% by weight, and the polyurethane was coagulated in an aqueous solution of DMF (DMF concentration, 30% by weight). Next, the polyvinyl alcohol and the DMF were removed with hot water, and drying with hot air at a temperature of 120° C. was conducted for 10 minutes to obtain a sheet product wherein the nonwoven fabric has been provided with the polyurethane resin so that the weight of the polyurethane resin to the weight of the polyester component of the nonwoven fabric is 30% by weight.

The thus obtained sheet product having the polyurethane resin provided therein was sliced in half in the thickness direction, and the surface opposite to the sliced surface was napped by grinding the surface with a 240 mesh endless sandpaper. The resulting suede-like substrate was then subjected to jet dyeing at 130° C. for 1 hour using a beige disperse dye, reduction, and neutralization treatment.

The resulting surface material 1 had a thickness of 0.6 mm, an apparent density of 0.47 g/cm³, and the nonwoven fabric/polyurethane weight ratio of 80/20.
[Surface Material 2]

Ultrafine polyethylene terephthalate fiber having a single fiber fineness of 0.21 dtex was produced by direct spinning, and the fiber was cut in the length of 5 mm to prepare the main staple. This main staple was dispersed in water to prepare a slurry, and a sheet for surface fiber layer having a unit weight of 100 g/m² was prepared from this slurry by filtering the slurry with a screen. A sheet for rear surface fiber layer having a unit weight of 50 g/m² was also prepared by dispersing the same main staple in water and filtering the slurry with a screen.

A fabric scrim comprising a polyethylene terephthalate fiber of 166 dtex/48f having a unit weight of 100 g/m² was inserted between the thus prepared sheet for the surface fiber layer and the thus prepared sheet for rear fiber layer to prepare a three-layer laminate.

This three-layer laminate was entangled for integration by spraying the laminate with a high-speed water jet produced by using a straight flow spraying nozzle, and the laminate was dried at 100° C. by using an air-through-type pin tenter dryer to fabricate a web having a three-layer structure for producing artificial leather.

This web was impregnated with an emulsion (concentration 10%) prepared by using a copolymer resin of polyethylene and a polybutylene terephthalate having an average particle diameter of 1.0 μm and a melting point of 160° C. as the thermoplastic resin in a pickup amount of 100%, and the web was heat treated at 180° C. by using a pin tenter dryer to conduct the drying and thermal fusion treatment of the thermoplastic resin.

Next, the surface was napped by grinding using a 240 mesh endless sandpaper, and the resulting suede-like substrate was subjected to jet dyeing at 130° C. for 1 hour using a beige disperse dye, reduction, and neutralization treatment.

The resulting surface material 2 had a thickness of 0.6 mm, an apparent density of 0.43 g/cm$^3$, and a nonwoven fabric/polyurethane weight ratio of 90/10.

[Surface Material 3]

Ethylene-modified polyvinyl alcohol as the thermoplastic resin of the sea component and isophthalic acid-modified polyethylene terephthalate (content of the isophthalic acid unit, 6.0% by mole) having a Tg of 110° C. as the thermoplastic resin of the island component were respectively melted and supplied to a multi-fiber spinning nozzle having a large number of parallelly arranged nozzle holes so that the fiber ejected has 10 islands having a consistent cross-sectional area distributed in the sea component. In this process, the resins were supplied by adjusting the pressure so that weight ratio of the sea component to the island component (the sea component/the island component) was 20/80, and the molten fiber was ejected from nozzle holes with the nozzle temperature set at 260° C.

A suction system in the form of an airjet nozzle was used for stretching the ejected fiber with the pressure of the air stream adjusted so that the molten fibers ejected from the nozzle holes had an average spinning speed of 3400 m/minute, and the resulting islands-in-the-sea composite long fiber had an average fineness of 2.5 dtex. The thus spun islands-in-the-sea composite long fiber was continuously deposited on a moving-type net with the suction applied from the rear surface of the net, and after peeling the resulting islands-in-the-sea composite long fiber web from the net, the web was temporally adhered to an embossed roll having a plaid pattern at surface temperature of 75° C. to form a long fiber web having a unit weight of 40 g/m$^2$.

Next, the resulting long fiber web was treated with a crosslapper apparatus to prepare a lapped web having a unit weight of 400 g/m$^2$, and then, with a needle puncher for three-dimensional entanglement. The entangled web after the needle punching had a unit weight of 500 g/m$^2$.

The resulting entangled web was wetted by water, and heat treated by allowing the web to stand for 3 minutes in an atmosphere at a temperature of 70° C. and a relative humidity of 95% with no tension applied to the web to thereby promote wet heat shrinkage. The thickness of the web was then adjusted by mangle rolls so that the unit weight was 900 g/m$^2$ and the apparent density was 0.60 g/cm$^3$.

Next, the densified entangled web was impregnated with an aqueous polyurethane emulsion mainly comprising a polycarbonate/ether polyurethane (solid content concentration, 30%), and the moisture content was dried in a drying oven at 150° C. to crosslink the polyurethane and thereby produce a polyurethane-entangled web composite having a weight ratio of the polyurethane/the entangled web of 18/82.

Next, the polyurethane-entangled web composite was immersed in a hot water at 95° C. for 20 minutes to extract and remove the sea component in the islands-in-the-sea composite long fiber, and the web composite was dried in a drying oven at 120° C. to produce an intermediate substrate sheet having a thickness of about 1.6 mm. The fibers in the intermediate substrate sheet had a single fiber fineness of 0.21 dtex. The resulting sheet was separated in half in the thickness direction, and the surface side was napped with a #240 sandpaper for suede-like finishing. The resulting suede-like substrate was subjected to jet dyeing at 130° C. for 1 hour using a beige disperse dye, reduction, and neutralization treatment.

The resulting surface material 3 had a thickness of 0.6 mm, an apparent density of 0.53 g/cm$^3$, and a nonwoven fabric/polyurethane weight ratio of 78/22.

[Surface Material 4]

An islands-in-the-sea composite staple comprising 20 parts of copolymerized polyester mainly comprising terephthalic acid and ethylene glycol containing 8 mol % of sodium 5-sulfoisophthalate in relation to the total acid component as the sea component and 80 parts of polyethylene terephthalate as the island component having a single fiber fineness of 3.8 decitex, island number of 16, and a staple length of 51 mm was passed through a card and crosslapper to produce a web. Next, the web was treated by an L barb needle punching at punching density of 3000 fibers/cm$^2$ to obtain a composite staple nonwoven fabric having an apparent fiber density 0.26 g/cm$^3$. Next, the web was immersed in an aqueous solution of polyvinyl alcohol having a degree of polymerization of 1500 and a degree of saponification of 99.5% heated to about 95° C. after adjusting the solid content concentration to 12% by weight so that the coating weight was 25% in terms of the solid content in relation to the weight of the nonwoven fabric. Shrinking treatment of 2 minutes was also conducted simultaneously with the impregnation of PVA, and drying was conducted at 100° C. to remove the moisture. After heating at 160° C. for 15 minutes, the resulting sheet was treated with 8% aqueous solution of sodium hydroxide at about 60° C. until the copolymerized polyester of the sea component was completely removed to obtain an ultrafine fiber sheet having a single fiber fineness of about 0.21 decitex.

Next, the ultrafine fiber sheet was impregnated with an aqueous emulsion of polycarbonate polyurethane resin which had be adjusted to a solid content concentration of 20% by weight, and the moisture was dried in a drying oven at 120° C. to crosslink the polyurethane. Next, the polyvinyl alcohol was removed by hot water, and drying with hot air at a temperature of 150° C. was conducted for 20 minutes to obtain a sheet product wherein the nonwoven fabric had been provided with the polyurethane resin so that the weight ratio of the polyurethane resin to the weight of the polyester component of the nonwoven fabric was 30% by weight.

The thus obtained sheet product having the polyurethane resin provided therein was sliced in half in the thickness direction, and the surface opposite to the sliced surface was napped by grinding the surface with a 240 mesh endless sandpaper.

The resulting suede-like substrate was then subjected to jet dyeing at 130° C. for 1 hour using a beige disperse dye, reduction, and neutralization treatment.

The resulting surface material 4 had a thickness of 0.6 mm, an apparent density of 0.49 g/cm$^3$, and a nonwoven fabric/polyurethane weight ratio of 80/20.

[Surface Material 5]

On the surface material 1, a DMF solution of a polycarbonate polyurethane was coated so that the solution weight was 1000 g/m$^2$, and after coagulation in water and solvent removal and water removal, drying in hot air was conducted at 120° C. to obtain wet microporous layer comprising microporous texture having an excellent surface smoothness.

In the meanwhile, silicone-modified polycarbonate polyurethane was coated on a patterned release paper to a dry thickness of 30 μm using a knife coater, and the coating was dried in hot air at 100° C. for 2 minutes to form a silicone-modified polyurethane surface layer. On this film, urethane 2 part adhesive comprising a polycarbonate polyurethane was coated to a dry thickness of 30 μm using a knife coater, and the coating was dried in hot air at 100° C. for 2 minutes to form a polyurethane adhesive layer. Next, to this top surface, the wet microporous layer formed on the material 1 as described above was disposed with the microporous layer facing this top surface and pressed to for thermal adhesion at 100° C., and aging was allowed to take place at 40° C. for 48 hours to solidify the adhesive by reaction, and the release paper was peeled off to obtain a full grain leather-like artificial leather (surface material 5) having a thickness of 0.7 mm.

[Surface Material 6]

A plain weave fabric prepared by using a polyethylene terephthalate filament of 110 decitex/288 filament at a strong twining of 1000 T/m was scoured by the method commonly used in the art, dyed (died in beige by using a disperse dye), and heat set at 170° C. for 30 seconds to produce a plain weaving having a warp density of 114 threads/2.54 cm and a weft density of 96 threads/2.54 cm and a thickness of 0.40 mm. The surface was then napped by using a 240 mesh endless sandpaper. Subsequently, the production method of the surface material 5 was repeated by replacing the surface material 1 used in the production of the surface material 5 with this napped plain weaving to obtain a full grain leather-like synthetic leather (surface material 6) having a thickness of 0.6 mm.

[Surface Material 7]

The production method of the surface material 6 was repeated except that the plain woven fabric used in the surface material 6 was used without napping to obtain a full grain leather-like synthetic leather (surface material 7) having a thickness of 0.6 mm.

[Surface Material 8]

A plain weave fabric prepared by using a polyethylene terephthalate filament of 56 decitex/48 filament at a strong twining of 2000 T/m was scoured by the method commonly used in the art, dyed (died in beige by using a disperse dye), and heat set at 170° C. for 30 seconds to produce a plain weaving having a warp density of 93 threads/2.54 cm and a weft density of 64 threads/2.54 cm and a thickness of 0.40 mm. The surface was then napped by using a 240 mesh endless sandpaper. Subsequently, the production method of the surface material 5 was repeated by replacing the surface material 1 used in the production of the surface material 5 with this napped plain weaving to obtain a full grain leather-like synthetic leather (surface material 8) having a thickness of 0.6 mm.

[Surface Material 9]

Thickness of a soft tanned calf leather (beige) manufactured by Poltrona Frau was adjusted by a slicer to obtain a natural leather sheet (surface material 9) having a thickness of 0.6 mm.

Next, materials used in producing the transparent conductive substrates used in the Examples and Comparative Examples are described.

[Undercoat Coating Solution]

An aqueous dispersion of a polyurethane resin ("Super Flex 150" having a solid content concentration of 30% by weight manufactured by DKS Co. Ltd.) was used for the resin of the undercoat layer, and an aqueous dispersion of silica particles ("Snow Tex OUP" having a solid content concentration of 15% by weight manufactured by Nissan Chemical Industries, Limited) was used for the silica particles in the undercoat layer. The Super Flex 150, the Snow Tex OUP, and pure water were mixed in a weight ratio of 5.25:4.5:5.25 to prepare a coating solution for the undercoat layer having a solid content of 15% by weight.

[Carbon Nanotube Dispersion]

A carbon nanotube dispersion was prepared by referring to Examples ([0052] to [0059]) of Japanese Unexamined Patent Publication (Kokai) No. 2015-115157.

[Overcoat Coating Solution 1]

Hexafunctional acryl monomer ("DPE-6A" manufactured by Kyoeisha Chemical Co., Ltd.) was diluted with a solvent prepared by mixing isopropyl alcohol and ethyl acetate at a weight ratio of 7:3 to adjust the solid content concentration to 2.0% by weight, and a photopolymerization initiator ("IRGACURE184" manufactured by BASF) in an amount of 5% by weight in relation to the resin solid content was added to prepare the overcoat coating solution 1.

[Overcoat Coating Solution 2]

Urethane acrylate ("UF-8001 g" manufactured by Kyoeisha Chemical Co., Ltd.) was diluted with a solvent prepared by mixing isopropyl alcohol and ethyl acetate at a weight ratio of 7:3 to adjust the solid content concentration to 2.0% by weight, and a photopolymerization initiator ("IRGACURE184" manufactured by BASF) in an amount of 5% by weight in relation to the resin solid content was added to prepare the overcoat coating solution 2.

Next, production method of the transparent conductive substrates used in the Examples and Comparative Examples is described.

[Transparent Conductive Substrate 1]

A polyester film ("LUMIRROR" (Registered Trademark) U48 manufactured by Toray Industries, Inc.) having a thickness of 100 μm was used for the substrate, and after coating an undercoat coating solution on a surface of the substrate by using a wire bar, the coating was dried at 100° C. for 1 minute to fo in an undercoat layer. A carbon nanotube dispersion was then coated on the undercoat layer by using a wire bar, and the coating was dried at 100° C. for 1 minute to form a carbon nanotube layer. An overcoat coating solution 1 was then coated on the carbon nanotube layer by using a wire bar, the coating was dried at 80° C. for 1 minute. UV irradiation was then conducted in nitrogen atmosphere by using a UV irradiator ("ECS-301" manufactured by EYE GRAPHICS CO., LTD.) at an integrated light amount of 400 mJ/cm$^2$ to obtain transparent conductive substrate 1.

[Transparent Conductive Substrate 2]

A polycarbonate film ("CARBOGLASS" (Registered Trademark) manufactured by ASAHI GLASS CO., LTD.) having a thickness of 200 μm was used for the substrate, and after coating an undercoat coating solution on a surface of the substrate by using a wire bar, the coating was dried at 100° C. for 1 minute to form a an undercoat layer. A carbon nanotube dispersion was then coated on the undercoat layer by using a wire bar, and the coating was dried at 100° C. for 1 minute to form a carbon nanotube layer. An overcoat coating solution 2 was then coated on the carbon nanotube layer by using a wire bar, the coating was dried at 80° C. for 1 minute. UV irradiation was then conducted in nitrogen atmosphere by using a UV irradiator ("ECS-301" manufactured by EYE GRAPHICS CO., LTD.) at an integrated light amount of 400 mJ/cm$^2$ to obtain transparent conductive substrate 2.

[Transparent Conductive Substrate 3]

The procedure used for preparing the transparent conductive substrate 2 was repeated except for the use of an aqueous dispersion of an electroconductive polymer PEDOT/PSS ("Clevios (Registered Trademark) PH500" manufactured by Heraeus K.K.) for the carbon nanotube dispersion to obtain transparent conductive substrate 3.

[Transparent Conductive Substrate 4]

An ITO film ("ELECRYSTA" (Registered Trademark) manufactured by NITTO DENKO CORPORATION) having a thickness of 50 μm was used for the transparent conductive substrate 4.

Example 1

A thermoplastic polyurethane hot melt adhesive (softening point, 100° C.) in molten state was placed on the back surface of the surface material 1 in dots, and the transparent conductive substrate 1 was disposed with the intervening adhesive coating layer, and these layers were adhered by passing between a metal roll and a back roll maintained at a surface temperature 130° C. to thereby produce a light-transmitting conductive laminate 1.

Example 2

The procedure of Example 1 was repeated except for the use of the surface material 2 to produce a light-transmitting conductive laminate 2.

Example 3

The procedure of Example 1 was repeated except for the use of the surface material 3 to produce a light-transmitting conductive laminate 3.

Example 4

The procedure of Example 1 was repeated except for the use of the surface material 4 to produce a light-transmitting conductive laminate 4.

Example 5

The procedure of Example 1 was repeated except for the use of the surface material 5 to produce a light-transmitting conductive laminate 5.

Example 6

The procedure of Example 1 was repeated except for the use of the surface material 6 to produce a light-transmitting conductive laminate 6.

Example 7

The procedure of Example 1 was repeated except for the use of the transparent conductive substrate 2 to produce a light-transmitting conductive laminate 7.

Example 8

The procedure of Example 1 was repeated except for the use of the transparent conductive substrate 3 to produce a light-transmitting conductive laminate 8.

Example 9

The procedure of Example 1 was repeated except for the use of the transparent conductive substrate 4 to produce a light-transmitting conductive laminate 9.

Example 10

Figure 7:
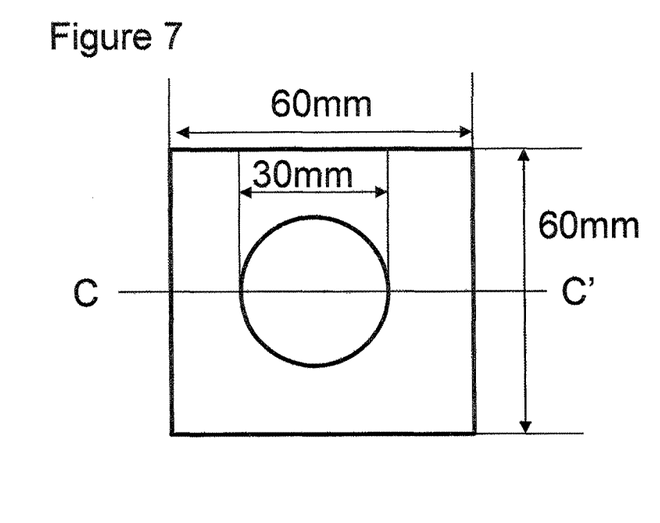
FIG. 7 is a schematic view of the mold used in the vacuum molding for producing the light-transmitting conductive molded laminate of the present invention.
Figure 8:
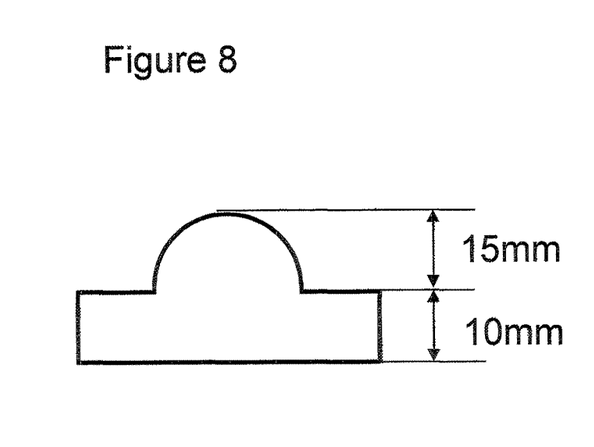
FIG. 8 is a cross sectional view taken along lines C-C' in FIG. 7.

The light-transmitting conductive laminate 7 was heated for 20 seconds in a vacuum forming machine ("Formech" manufactured by Nihon Seizuki Kogyo Co., Ltd.) with the temperature of the heater set at 400° C., and vacuum molding was conducted by using the mold shown in FIG. 7 at a mold temperature of 120° C. to produce a light-transmitting conductive molded laminate 1.

Example 11

The procedure of Example 7 was repeated except for the use of the light-transmitting conductive laminate 8 to produce a light-transmitting conductive molded laminate 2.

Comparative Example 1

The procedure of Example 1 was repeated except for the use of the surface material 7 to produce a light-transmitting conductive laminate 101. In the visual recognition test of the see-through letters of the surface material, the letters looked like an assembly of discontinuous points with varying brightness. The shape of the letters was hardly indiscernible while light transmission could be confirmed.

Comparative Example 2

The procedure of Example 1 was repeated except for the use of the surface material 8 to produce a light-transmitting conductive laminate 102. The anti-see-through property of the surface material was insufficient, and the black color of the light-shielding film and light gray color of the backlight casing could be seen through the light-transmitting conductive laminate even when the backlight was not turned on in the visual recognition test of the see-through letters of the surface material.

Comparative Example 3

The procedure of Example 1 was repeated except for the use of the surface material 9 to produce a light-transmitting conductive laminate 103. The letters did not become see-through in the visual recognition test of the see-through letters of the surface material.

Comparative Example 4

The procedure of Example 10 was repeated except for the use of the light-transmitting conductive laminate 9 to produce a light-transmitting conductive molded laminate 101. The measurement was not indicated in the measurement of the surface resistance after the molding because of insulation.

TABLE 1

| | | Examples | | | | | | | | | | | Comparative Examples | | | |
|---|---|---|---|---|---|---|---|---|---|---|---|---|---|---|---|---|
| | | 1 | 2 | 3 | 4 | 5 | 6 | 7 | 8 | 9 | 10 | 11 | 1 | 2 | 3 | 4 |
| Transparent conductive substrate | | 1 | 1 | 1 | 1 | 1 | 1 | 2 | 3 | 4 | 2 | 3 | 1 | 1 | 1 | 4 |
| Surface material | | 1 | 2 | 3 | 4 | 5 | 6 | 1 | 1 | 1 | 1 | 1 | 7 | 8 | 9 | 1 |
| Nonwoven structure in the surface material | | Yes | Yes | Yes | Yes | Yes | No | Yes | Yes | Yes | Yes | Yes | No | No | No | Yes |
| Napped layer structure in the surface material | | Yes | Yes | Yes | Yes | Yes | Yes | Yes | Yes | Yes | Yes | Yes | No | Yes | No | Yes |
| Surface resistance of the light-transmitting conductive laminate | Ω/□ | 200 | 200 | 200 | 200 | 200 | 200 | 200 | 200 | 150 | 200 | 200 | 200 | 200 | 200 | 150 |
| Surface resistance of the light-transmitting conductive molded laminate | Ω/□ | — | — | — | — | — | — | — | — | — | 300 | 400 | — | — | — | Unmeasurable |
| Total light transmission of the light-transmitting conductive laminate | % | 28 | 31 | 22 | 27 | 22 | 35 | 28 | 28 | 30 | 28 | 28 | 40 | 51 | 0 | 30 |
| | Evaluation | Pass | Pass | Pass | Pass | Pass | Pass | Pass | Pass | Pass | Pass | Pass | Pass | Pass | Fail | Pass |
| Anti-see-through property of the light-transmitting conductive laminate | % | 98 | 97 | 98 | 98 | 98 | 99 | 98 | 98 | 98 | 98 | 98 | 95 | 77 | 100 | 98 |
| | Evaluation | Pass | Pass | Pass | Pass | Pass | Pass | Pass | Pass | Pass | Pass | Pass | Pass | Fail | Pass | Pass |
| Visual recognizability of the light-transmitting conductive laminate | Point | 15 | 15 | 15 | 15 | 15 | 15 | 15 | 15 | 15 | 15 | 15 | 10 | 12 | 5 | 15 |
| | Evaluation | Pass | Pass | Pass | Pass | Pass | Pass | Pass | Pass | Pass | Pass | Pass | Fail | Pass | Fail | Pass |

TABLE 2

| Type | Transparent substrate | Electroconductive material |
|---|---|---|
| Transparent conductive substrate 1 | Polyester | CNT |
| Transparent conductive substrate 2 | Polycarbonate | CNT |
| Transparent conductive substrate 3 | Polycarbonate | PEDOT/PSS |
| Transparent conductive substrate 4 | Polyester | ITO |

EXPLANATION OF NUMERALS

1: light-transmitting conductive laminate
2: surface material
3: adhesive layer
4: transparent conductive substrate
5: diffusion plate
6: LED
7: light-transmitting conductive molded laminate

The invention claimed is:

1. A light-transmitting conductive laminate at least comprising a surface material and a transparent electrically conductive substrate laminated in this order from an outer side of the light-transmitting conductive laminate,
    wherein the surface material comprises a layer consisting of at least one member selected from the group consisting of woven fabric, knitted fabric, nonwoven fabric, synthetic leather, and artificial leather and a surface of the surface material has been napped,
    wherein the light-transmitting conductive laminate has a total light transmission of at least 20%,
    wherein the light-transmitting conductive laminate has a visual recognizability of see-through letters and symbols of the surface material, as determined by a light arranged on a back surface of the transparent conductive substrate to display a design on a surface of the surface material by illuminating the light,
    wherein the surface material has an anti-see-through property of at least 90%, where anti-see-through property (%)=(lightness of the light-transmitting conductive laminate in the use of a black tile)/(lightness of the light-transmitting conductive laminate in the use of a white tile)×100, and
    wherein a display mark is printed on the transparent conductive substrate.

2. A light-transmitting conductive laminate according to claim 1 wherein the surface material contains a synthetic fiber having a single fiber fineness of up to 2 dtex and a polymer elastomer.

3. A light-transmitting conductive laminate according to claim 1 wherein the light-transmitting conductive laminate has a surface resistance of 1 to 1000 Ω/□.

4. A light-transmitting conductive laminate according to claim 1 wherein the transparent conductive substrate contains at least one member selected from the group consisting of nanocarbon, indium-tin oxide, silver, copper, metal nanowire, and electroconductive polymer.

5. A light-transmitting conductive molded laminate prepared by using the light-transmitting conductive laminate according to claim 1.

6. A light-transmitting conductive molded laminate according to claim 5 wherein the transparent conductive substrate contains a nanocarbon or an electroconductive polymer.

7. A capacitive touch sensor prepared by using the light-transmitting conductive laminate according to claim 1.

8. A method for producing the light-transmitting conductive molded laminate wherein the light-transmitting conductive laminate according to claim 1 is molded by at least one member selected from the group consisting of film insert molding, vacuum molding, three dimensional laminate molding, and thermal press molding.

9. A light-transmitting conductive laminate according to claim 1, wherein the nonwoven fabric comprises:
    (i) a natural fiber comprising cotton, linen, wool, or silk,
    (ii) a polyester comprising polyethylene terephthalate, polybutylene terephthalate, polytrimethylene terephthalate, or polyethylene-2,6-naphthalene dicarboxylate, (iii) a polyamide comprising 6-nylon or 66-nylon,
(iv) a synthetic fiber comprising polyvinyl alcohol, polyacryl, polyethylene, or polypropylene, or
(v) a combination thereof.

10. A light-transmitting conductive laminate according claim 1, wherein the surface material has been napped, and
wherein the light-transmitting conductive laminate comprises the entire napped surface of the surface material disposed over the transparent electrically conductive substrate.

11. A light-transmitting conductive laminate according claim 1, wherein the surface material contains a synthetic fiber having a single fiber fineness of at least 0.001 dtex and upto 1.0 dtex and a polymer elastomer, or an apparent density of at least 0.30 to 0.70 g/cm$^3$.

* * * * *